United States Patent [19]

Schreiner

[11] Patent Number: 4,478,106
[45] Date of Patent: Oct. 23, 1984

[54] MULTI-GEAR TRANSMISSION SYSTEM SHIFTABLE UNDER LOAD

[75] Inventor: Friedrich Schreiner, Kehlen, Fed. Rep. of Germany

[73] Assignee: Zahnradfabrik Friedrichshafen, AG., Friedrichshafen, Fed. Rep. of Germany

[21] Appl. No.: 277,976

[22] Filed: Jun. 25, 1981

[30] Foreign Application Priority Data

Jul. 1, 1980 [DE] Fed. Rep. of Germany ....... 3024862

[51] Int. Cl.³ .......................... F16H 37/00; F16H 3/02; F16H 57/10
[52] U.S. Cl. .......................... 74/740; 74/745; 74/759; 74/753
[58] Field of Search .................. 74/740, 745, 753, 758, 74/759, 664, 331

[56]  References Cited
U.S. PATENT DOCUMENTS

| 3,362,245 | 1/1968 | Francuch et al. | 74/745 X |
| 3,508,450 | 4/1970 | Richards | 74/340 |
| 3,570,636 | 3/1971 | Franz et al. | 74/740 X |
| 3,733,928 | 5/1973 | Uozumi et al. | 74/753 |
| 3,802,293 | 4/1974 | Winckler | 74/745 |
| 3,824,876 | 7/1974 | Mori et al. | 74/759 |
| 3,863,524 | 2/1975 | Mori et al. | 74/759 X |
| 3,946,624 | 3/1976 | Murakami et al. | 74/753 X |
| 3,956,946 | 5/1976 | Murakami et al. | 74/753 X |
| 3,971,268 | 7/1976 | Murakami et al. | 74/753 X |
| 4,089,239 | 5/1978 | Murakami et al. | 74/753 X |
| 4,143,562 | 3/1979 | Murakami et al. | 74/759 X |
| 4,280,370 | 7/1981 | Schreiner | 74/339 |

FOREIGN PATENT DOCUMENTS

| 659207 | 3/1963 | Canada | 74/758 |
| 3024862 | 1/1982 | Fed. Rep. of Germany . | |
| 354339 | 6/1961 | Switzerland | 74/753 |
| 2023752 | 1/1980 | United Kingdom | 74/758 |
| 215040 | 3/1968 | U.S.S.R. | 74/759 |

Primary Examiner—Allan D. Herrmann
Assistant Examiner—Stephen B. Andrews
Attorney, Agent, or Firm—Karl F. Ross; Herbert Dubno

[57]  ABSTRACT

A gear-shifting mechanism for an automotive transmission or the like comprises a first power train with at least two cascaded ratio-changing couplers inserted between an input shaft and an output shaft, the cascaded couplers being bypassed by a second power train which is normally disengaged but is engageable during shiftovers to interconnect the two shafts with at least one step-down ratio different from any of the speed ratios that can be established by the first power train. The two or possibly more power trains may be constituted by planetary-gear assemblies. One or more of the cascaded couplers could be divided into parallel sections to be alternatively clutched in.

8 Claims, 6 Drawing Figures

MULTI-GEAR TRANSMISSION SYSTEM SHIFTABLE UNDER LOAD

FIELD OF THE INVENTION

My present invention relates to a gear-shifting mechanism, e.g. as used in an automotive transmission, designed to be shiftable under load for selectively establishing a multiplicity of different speed ratios between an input shaft and an output shaft.

BACKGROUND OF THE INVENTION

Especially with heavy-duty equipment such as utility vehicles it is often necessary to be able to shift among more than the usual three or four speed ratios or "gears" available in the transmission of passenger cars. For this purpose it is known to provide a power train with a plurality of cascaded ratio-changing transmission units or couplers including a basic coupler with m speed ratios and a group coupler with n speed ratios, m being generally higher than n. This enables the selective establishment of n (usually two) groups of m speed ratios each, giving a total of m.n different overall speed ratios.

During progressive upshifting from minimum speed ratio ("first gear") to maximum speed ratio (e.g. "direct drive"), the group coupler is initially in its lowest position (corresponding to maximum step-down) while the basic coupler is being successively switched from "first gear" through "$m^{th}$ gear". The next step calls for a return of the basic coupler to "low" while the group coupler is advanced into its second lowest position; this requires a simultaneous disengagement of both couplers for a brief period. When the system is under heavy load, as where a vehicle is being driven uphill, this interruption may cause a significant change in the relative speeds of the two shafts which could interfere with a smooth changeover to the next-higher speed ratio. An analogous situation exists during progressive downshifting.

It has therefore already been proposed, e.g. as described in U.S. Pat. No. 3,802,293, to provide a second power train bypassing the cascaded couplers in order to prevent an excessive slip in the relative shaft speeds. In the known system the bypass consists of a jaw clutch whose members are normally disengaged but can be engaged with a speed ratio corresponding to "$m^{th}$ gear" of the basic coupler and "low" of the group coupler, with m=6 in the example described in that U.S. patent where the group coupler has only two positions; the same speed ratio is obtained when the basic coupler is in "first gear" and the group coupler is in "high". The total number of available overall speed ratios is therefore m.n−1, or 11 in the specific example.

OBJECT OF THE INVENTION

The object of my present invention is to provide an improved gear-shifting mechanism of the general type referred to which increases the number of overall speed ratios available with a given number of transmission stages.

SUMMARY OF THE INVENTION

This object is realized, in accordance with my present invention, by replacing the jaw clutch of the known system in the second power train with a further or bypass coupler which is normally disengaged and is engageable to interconnect the two shafts during simultaneous deactivation of the cascaded basic and group couplers, i.e. preparatorily to shifting from one m-speed group to another, thereby establishing a further overall speed ratio lying between these m-speed groups.

My present invention makes it possible to use a group coupler with more than two speed ratios, i.e. with n>2, in a transmission shiftable under load. In such a case the bypass coupler of the second power train is to have (n−1) working positions providing as many intermediate speed ratios not obtainable with the cascaded couplers of the first power train. Even with a bypass coupler supplying only one intermediate speed ratio, therefore, I am able to provide n.m+1 different overall speed ratios which is two more than can be obtained with the conventional system.

The engagement of the bypass coupler can be carried out as soon as either of the two cascaded couplers has been disengaged; thus, the bypass coupler can be made effective immediately after the basic coupler has been deactivated for a return from "$m^{th}$ gear" to "first gear" during upshifting (or vice versa during downshifting), before a changeover of the group coupler to its next-higher (or next-lower) position. Since the step from the highest speed ratio of the lower group or from the lowest speed ratio of the higher group to the intermediate speed ratio of the bypass coupler is of the same order of magnitude as the steps within a group, I may use any conventional gear shifter for that bypass coupler; for a particularly smooth transition from one power train to the other, however, I prefer to utilize a planetary-gear assembly for that coupler.

BRIEF DESCRIPTION OF THE DRAWING

The above and other features of my present invention will now be described in detail with reference to the accompanying drawings in which.

SPECIFIC DESCRIPTION

Figure 1:
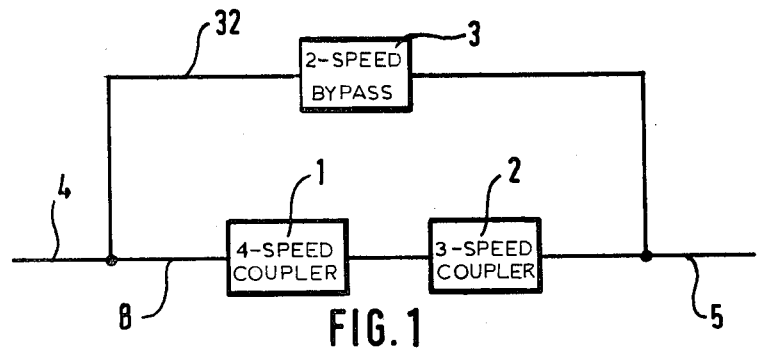
FIG. 1 is a block diagram showing the basic structure of a gear-shifting mechanism according to my invention.

As schematically indicated in FIG. 1, a gear-shifting mechanism according to my invention comprises an input shaft 4 and an output shaft 5 linked by two parallel power trains, only one of them being effective at any time during which torque is to be transmitted from shaft 4 to shaft 5. The first power train, which is the one normally engaged, includes an extension 8 of shaft 4, a basic coupler 1 with four speed ratios or "gears", and a group coupler 2 with three speed ratios or "gears" in cascade therewith. The second power train comprises another extension 32 of shaft 4 and a further coupler 3 with two speed ratios or "gears".

Figure 2:
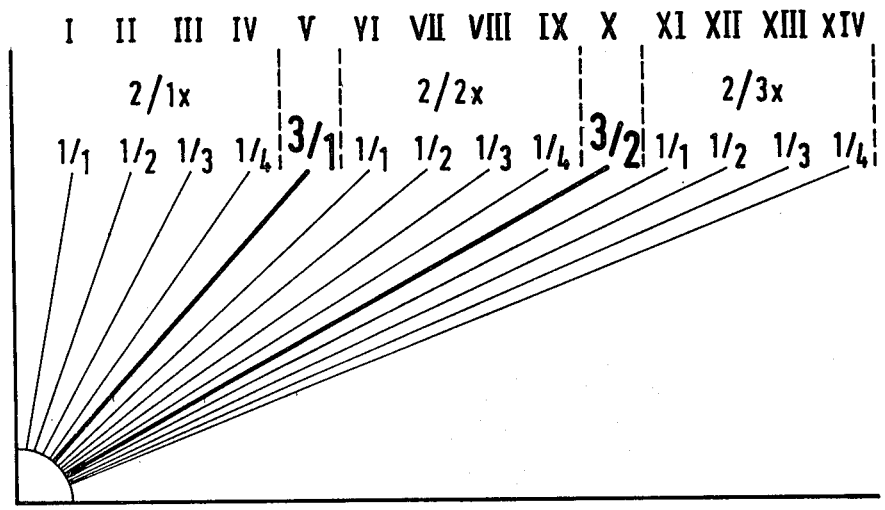
FIG. 2 is a graph indicating the various overall speed ratios available with the system of FIG. 1.

This mechanism provides 14 distinct overall speed ratios designated by numerals I–XIV in the graph of FIG. 2. A first speed group I–IV is established in the four positions of basic coupler 1, respectively designated 1/1, 1/2, 1/3 and 1/4 in FIG. 2, while group coupler 2 has its maximum step-down ration in a "low" position designated 2/1x. A second group VI-IX is established in the same four positions of basic coupler 1 while group coupler 2 is in a "middle" position 2/2x representing a median step-down ratio. A third group XI-XIV again makes use of the four positions of basic coupler 1 with group coupler 2 occupying a "high" position 2/3x denoting a minimum step-down ratio, preferably 1:1. The two intermediate speed ratios V and X come into play with at least one of the cascaded couplers 1, 2 deactivated and with bypass coupler 3 shifted into its lower position 3/1 (with relatively large step-down ratio) or into its higher position 3/2 (with relatively small step-down ratio).

Figure 3:
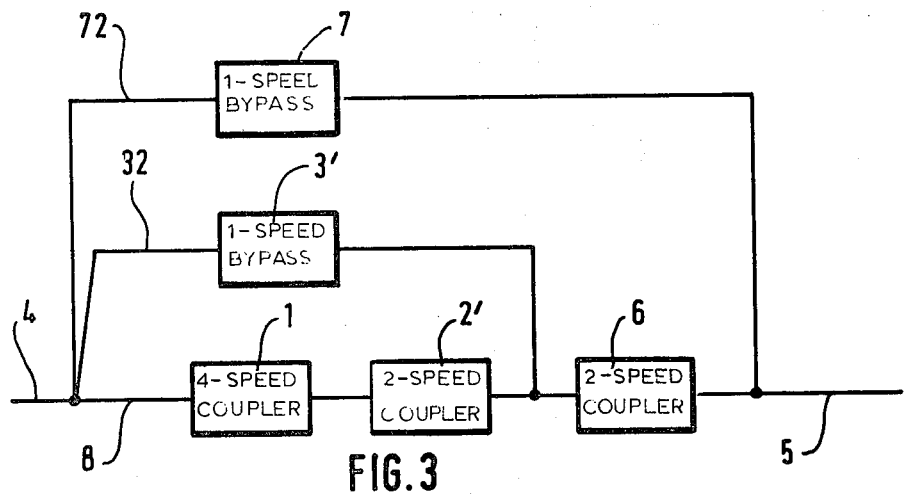
FIG. 3 is a block diagram similar to that of FIG. 1, showing a more elaborate gear-shifting mechanism according to my invention.

FIG. 3 shows an expanded gear-shifting mechanism according to my invention in which the group coupler 2' of the first power train has only two speed ratios while the bypass coupler 3' of the second power train can establish but a single ratio. The first power train, however, further includes a supplemental two-speed coupler 6 in cascade with couplers 1, 2' and with bypass coupler 3'; the entire cascade is bypassed by a third power train comprising another extension 72 of input shaft 4 and a normally disengaged coupler 7 with a single speed ratio.

Figure 4:
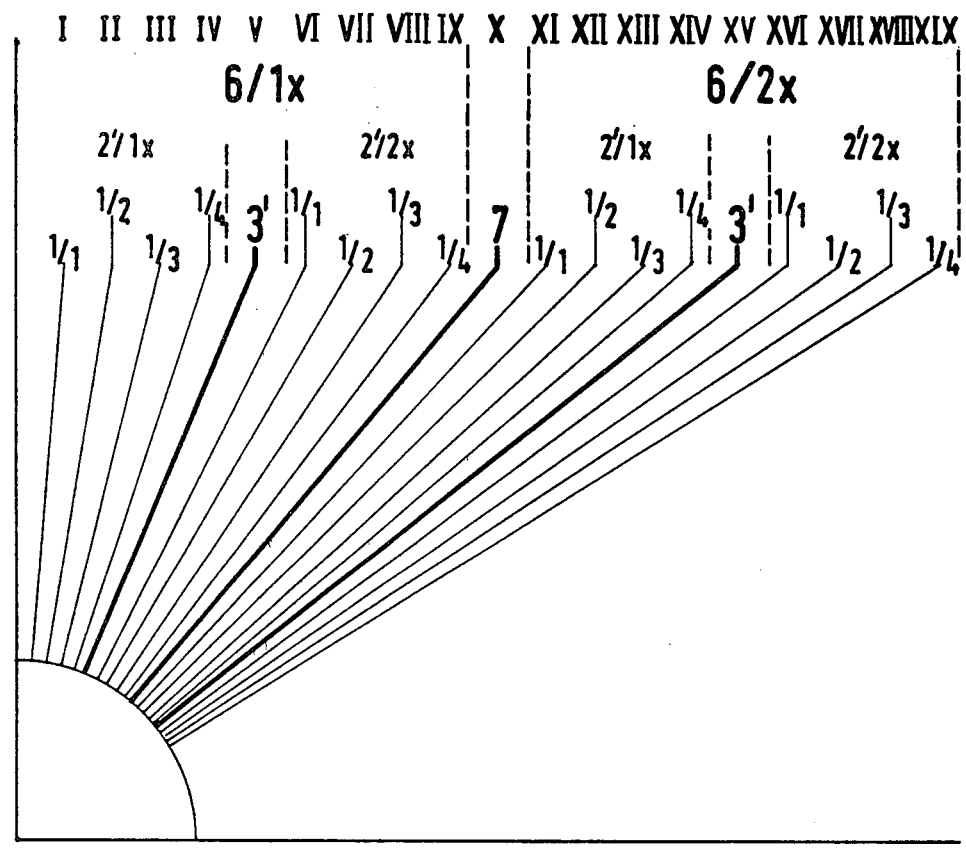
FIG. 4 is graph similar to that of FIG. 2, relating to the embodiment of FIG. 3.

FIG. 4 illustrates 19 speed ratios I-XIX obtainable with the mechanism of FIG. 3. There are, thus, four speed groups I-IV, VI-IX, XI-XIV and XVI-XIX each encompassing the four positions of basic coupler 1, one of the two positions 2'/1x and 2'/2x of group coupler 2' and one of the two positions 6/1x, 6/2x of the supplemental coupler 6. Two intermediate speed ratios V and XV are established by the engagement of coupler 3' of the second power train and by the two positions of coupler 6 in cascade therewith, whereas a further intermediate speed ratio X is brought about by the engagement of bypass coupler 7 alone.

Figure 5:
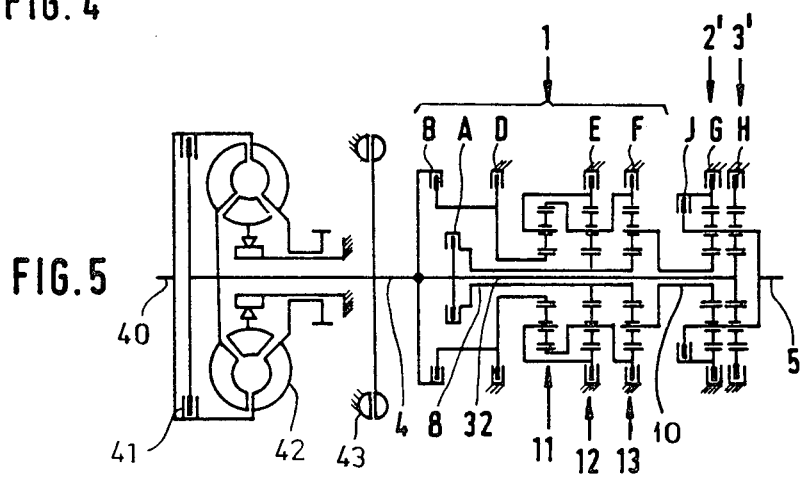
FIG. 5 is a schematic representation of an entire transmission incorporating a gear-shifting mechanism according to my invention.

In FIG. 5 I have illustrated an advantageous structure for a gear-shifting mechanism of the type shown in FIG. 1 wherein, however, the group coupler of the first power train and the bypass coupler of the second power train have only two working positions and a single working position, respectively, like the corresponding couplers 2' and 3' in FIG. 3. The basic coupler 1 is shown to comprise three planetary-gear sets 11, 12 and 13, two clutches A, B and three brakes D, E, F. The group coupler 2' comprises a single planetary-gear set with a brake G and a clutch J. The bypass coupler 3' also consists of a single planetary-gear set provided with a brake H. Also shown in FIG. 5 is a drive shaft 40 which may be directly powered by the engine of an automotive vehicle whose traction wheels are driven by output shaft 5. Drive shaft 40 can be coupled with input shaft 4 through a clutch 41 or through a conventional hydraulic torque converter 42; clutch 41, when operated, may be used for reverse driving by rotating the shaft 4 in a direction opposite that imparted to it for forward driving by way of converter 42. A master brake 43 for arresting the shaft 4 has also been indicated.

Extension shaft 32 is here unitary with input shaft 4 whereas extension shaft 8 is a tube which coaxially surrounds the shaft 32 and can be solidified therewith by the operation of clutch A. Another tubular shaft 10 also surrounds the extension shaft 32 and serves as a link between the cascaded couplers 1 and 2'. Operation of clutch B connects shaft 32 with the sun gear of set 11; this sun gear is immobilized upon the engagement of brake D. Brake E serves to arrest the planet carrier of set 11 whereas brake F is able to stop the ring gears of sets 11, 13 and the planet carrier of set 12. The ring gears of couplers 2' and 3' are respectively controlled by brakes G and H; output shaft 5, keyed to the planet carriers of both couplers 2' and 3', is solidified with the ring gear of coupler 2' by the operation of clutch J.

As will be apparent from the foregoing description, the system of FIG. 5 can establish nine different speed ratios or "gears" between shafts 4 and 5. The four lowest speed ratios can be selected with coupler 2' in its "low" position in which brake G is engaged to arrest the ring gear of its planetary-gear set; this establishes a step-down ratio of 4.6:1, for example, between the connecting shaft 10 rigid with its sun gear and the output shaft 5 rigid with its planet carrier. With clutch A engaged to solidify shafts 8 and 32, the step-down ratio between shafts 8 and 10 may be, for example, 2.81:1, 1.84:1, 1.36:1 and 1:1 upon engagement of brake F, brake E, brake D and clutch B, respectively; this corresponds to an overall speed ratio of 12.9:1, 8.46:1, 6.25:1 and 4.6:1. With all brakes and clutches of basic coupler 1 released for a switchover to the higher group, brake H of coupler 3' can be engaged to arrest the ring gear of its planetary-gear set. Since the corresponding sun gear is keyed to extension shaft 32, coupler 3' establishes a speed ratio of, say, 3.58:1 between shafts 4 and 5 whether or not brake G of coupler 2' is still engaged. The driver can now operate clutch J in lieu of brake G to establish a 1:1 speed ratio for coupler 2'; after the release of brake H, clutch A and brake F can be jointly engaged to provide the lowest speed ratio of the second group, namely 2.81:1 in the example given above. Further upshifting, with successive replacement of brake F by brakes E and D and clutch B, will then establish the three highest speed ratios of 1.84:1, 1.36:1 and 1:1, respectively. For downshifting, of course, the reverse procedure is followed.

Figure 6:
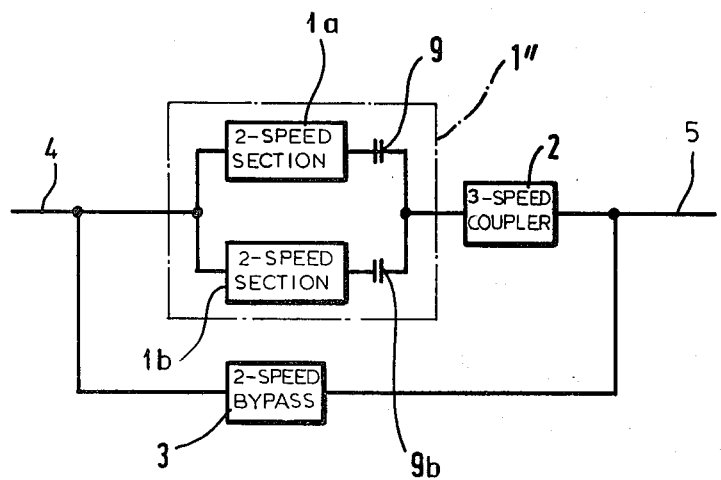
FIG. 6 is another block diagram showing a further modification.

In FIG. 6 I have shown the basic coupler 1 of FIG. 1 replaced by a modified coupler 1" with two parallel sections 1a and 1b of two speeds each which can be alternatively engaged by respective clutches 9a and 9b. This enables the use of fewer stages, of either the sliding-gear or the planetary-gear type, for the establishment of the desired number m of speed ratios (here four) by that coupler. It will be apparent that other couplers of the gear-shifting mechanism could be similarly divided. Reference may be made to my copending application Ser. No. 127,065 filed Mar. 4, 1980, now U.S. Pat. No. 4,280,370, for a clutch assembly which is switchable under load and which may be used for the two clutches 9a and 9b shown in FIG. 6.

A bypass coupler such as the one shown at 3' in FIG. 5 can readily be added to a conventional automatic transmission of, say, eight speeds to make same shiftable under load and provide it with at least one additional speed ratio.

I claim:
1. A gear-shifting mechanism enabling the establishment of a multiplicity of different speed ratios between an input shaft and an output shaft, comprising:
  a first power train connecting said input shaft with said output shaft and including two cascaded ratio-changing couplers, one of said couplers being shiftable among m different speed ratios, the other of said couplers being shiftable among n different speed ratios enabling the selective establishment of n groups of m speed ratios each for a total of m.n different overall speed ratios; and a second power train bypassing said cascaded couplers, said second power train including a further coupler having at least two selectively effective speed ratios which is normally disengaged and is engageable to interconnect said shafts during simultaneous deactivation of said cascaded couplers, preparatorily to a shifting between two adjoining groups of m speed ratios, to establish an intermediate speed ratio lying between the two closest overall speed ratios of said adjoining groups.

2. A gear-shifting mechanism enabling the establishment of a multiplicity of different speed ratios between an input shaft and an output shaft, comprising:

a first power train connecting said input shaft with said output shaft and including two cascaded ratio-changing couplers, one of said couplers being shiftable among m different speed ratios, the other of said couplers being shiftable among n different speed ratios enabling the selective establishment of n groups of m speed ratios each for a total of m.n different overall speed ratios; and a second power train bypassing said cascaded couplers, said second power train including a further coupler which is normally disengaged and is engageable to interconnect said shafts during simultaneous deactivation of said cascaded couplers, preparatorily to a shifting between two adjoining groups of m speed ratios, to establish an intermediate speed ratio lying between the two closest overall speed ratios of said adjoining groups, wherein $n > 2$, said further coupler being selectively shiftable into any of $(n-1)$ intermediate speed ratios each lying between the two closest overall speed ratios of a respective pair of adjoining groups.

3. A gear-shifting mechanism enabling the establishment of a multiplicity of different speed ratios between an input shaft and an output shaft, comprising:

a first power train connecting said input shaft with said output shaft and including two cascaded ratio-changing couplers, one of said couplers being shiftable among m different speed ratios, the other of said couplers being shiftable among n different speed ratios enabling the selective establishment of n groups of m speed ratios each for a total of m.n different overall speed ratios; and a second power train bypassing said cascaded couplers, said second power train including a further coupler which is normally disengaged and is engageable to interconnect said shafts during simultaneous deactivation of said cascaded couplers, preparatorily to a shifting between two adjoining groups of m speed ratios, to establish an intermediate speed ratio lying between the two closest overall speed ratios of said adjoining groups, said other of said couplers and said further coupler comprising respective planetary-gear assemblies.

4. A gear-shifting mechanism as defined in claim 2 or 3 wherein said first power train includes a third ratio-changing coupler in cascade with said two couplers and said further coupler, said additional coupler being shiftable among p different speed ratios whereby the number of available overall speed ratios is multiplied by p, further comprising a third power train bypassing all three cascaded couplers, said third power train including an additional coupler shiftable between a disengaged state and any of $(p-1)$ speed ratios lying between the speed ratios obtainable from said three cascaded couplers and from said further coupler.

5. A gear-shifting mechanism as defined in claim 4 wherein said additional coupler comprises at least one planetary-gear assembly.

6. A gear-shifting mechanism as defined in claim 2 or 3 wherein at least one of said cascaded couplers is divided into a plurality of alternatively engageable parallel two speed transmission sections.

7. A gear-shifting mechanism enabling the establishment of a multiplicity of different speed ratios between an input shaft and an output shaft, comprising:

a first power train connecting said input shaft with said output shaft and including two cascaded ratio-changing couplers, one of said couplers being shiftable among m different speed ratios, the other of said couplers being shiftable among n different speed ratios enabling the selective establishment of n groups of m speed ratios each for a total of m.n different overall speed ratios; and a second power train bypassing said cascaded couplers, said second power train including a further coupler which is normally disengaged and is engageable to interconnect said shafts during simultaneous deactivation of said cascaded couplers, preparatorily to a shifting between two adjoining groups of m speed ratios, to establish an intermediate speed ratio lying between the two closest overall speed ratios of said adjoining groups, said cascaded couplers being linked by a tubular shaft coaxially surrounding an extension of said input shaft, said further coupler being operable to connect said extension with said intermediate speed ratio to said output shaft.

8. A gear-shifting mechanism as defined in claim 7 wherein said other of said couplers comprises a first sun gear rigid with said tubular shaft, a first ring gear selectively immobilizable by a first brake, and a planet carrier with first planetary gear means engaging said first sun gear and said first ring gear; said further coupler comprising a second sun gear rigid with said extension, a second ring gear selectively immobilizable by a second brake, and second planetary gear means on said planet carrier engaging said second sun gear and said second ring gear, said output shaft being connected to said planet carriers; further comprising clutch means for selectively coupling said planet carriers with said first ring gear in an unoperated state of said first brake.

* * * * *